(12) United States Patent
Birtcher et al.

(10) Patent No.: US 10,663,072 B2
(45) Date of Patent: May 26, 2020

(54) VALVE BLOCK HAVING MINIMAL DEADLEG

(71) Applicant: Versum Materials US, LLC, Tempe, AZ (US)

(72) Inventors: Charles Michael Birtcher, Valley Center, CA (US); Gildardo Vivanco, San Diego, CA (US); William Jon Sheehy, Valley Center, CA (US)

(73) Assignee: VERSUM MATERIALS US, LLC, Tempe, AZ (US)

( * ) Notice: Subject to any disclaimer, the term of this patent is extended or adjusted under 35 U.S.C. 154(b) by 0 days.

(21) Appl. No.: 15/526,867

(22) PCT Filed: Nov. 13, 2015

(86) PCT No.: PCT/US2015/060656
§ 371 (c)(1),
(2) Date: May 15, 2017

(87) PCT Pub. No.: WO2016/077740
PCT Pub. Date: May 19, 2016

(65) Prior Publication Data
US 2017/0335987 A1     Nov. 23, 2017

Related U.S. Application Data

(60) Provisional application No. 62/080,281, filed on Nov. 15, 2014.

(51) Int. Cl.
*F16K 27/00*     (2006.01)
*F16K 24/02*     (2006.01)
*F16K 27/02*     (2006.01)
*B08B 9/032*     (2006.01)
*F26B 5/00*      (2006.01)

(52) U.S. Cl.
CPC ............ *F16K 27/00* (2013.01); *B08B 9/0328* (2013.01); *F16K 24/02* (2013.01); *F16K 27/003* (2013.01); *F16K 27/02* (2013.01); *F26B 5/00* (2013.01)

(58) Field of Classification Search
CPC .......... F16K 27/00; F16K 27/003; F26B 5/00; Y10T 137/87885; Y10T 137/7259
See application file for complete search history.

(56) References Cited

U.S. PATENT DOCUMENTS 3,806,088 A * 4/1974 Stoneman ........... F15B 13/0814
                                                 137/884
4,281,683 A * 8/1981 Hetherington .......... F16K 11/22
                                                 137/240
5,823,228 A    10/1998 Chou
(Continued)

FOREIGN PATENT DOCUMENTS

WO    WO-9734134 A1 * 9/1997 ............... G01F 1/36

OTHER PUBLICATIONS

Korean International Search Report and Written Opinion of the International Searching Authority, dated Feb. 16, 2016, for PCT/US2015/060656.

*Primary Examiner* — Jessica Cahill
(74) *Attorney, Agent, or Firm* — Anne B. Kiernan

(57) ABSTRACT

In one respect, the invention is an improved valve block design having minimal or no deadlegs that improves the efficiency of a system purge process. In another respect, the invention is a system incorporating said improved valve block design.

20 Claims, 5 Drawing Sheets

(56) References Cited

U.S. PATENT DOCUMENTS

| | | | | |
|---|---|---|---|---|
| 5,988,203 A | * | 11/1999 | Hutton | G01F 1/36 |
| | | | | 137/271 |
| 5,992,463 A | * | 11/1999 | Redemann | C23C 16/44 |
| | | | | 137/240 |
| 6,000,427 A | * | 12/1999 | Hutton | F16K 27/003 |
| | | | | 137/597 |
| 6,035,893 A | | 3/2000 | Ohmi et al. | |
| 6,644,348 B2 | | 11/2003 | Possanza et al. | |
| 2006/0060253 A1 | | 3/2006 | Yoshida et al. | |
| 2009/0250126 A1 | | 10/2009 | Koyomogi | |
| 2013/0333768 A1 | | 12/2013 | Chandrasekharan et al. | |

* cited by examiner

VALVE BLOCK HAVING MINIMAL DEADLEG

CROSS-REFERENCE TO RELATED APPLICATION

This application claims the benefit of U.S. Provisional Application No. 62/080,281, filed Nov. 15, 2014, which is hereby incorporated by reference as if fully set forth.

BACKGROUND

The electronic device fabrication industry requires various liquid chemicals as raw materials or precursors to fabricate integrated circuits and other electronic devices. It is important that during the electronic device fabrication process the various liquid chemicals used are not mixed together and are individually maintained at high purities, in order to meet the stringent requirements of the electronic fabrication industry.

During the electronic device fabrication process, these various liquid chemicals are repeatedly moved between chemical containers and one or more valve-containing manifolds via a common system of conduits and ports (openings). Therefore, at different phases during the fabrication process, it is necessary to purge a particular chemical from all wetted surfaces within the system before a new chemical may be introduced to the system. This is commonly accomplished via the use of a purge gas that is forced through the system.

As the term relates to the present field of technology, a "non-impinged deadleg" is a portion of a piping or conduit system that purge gas cannot be directly projected into. In existing systems, the geometry of the conduits and ports makes it such that one or more non-impinged deadlegs are present in the system during the purge step. The presence of one or more non-impinged deadlegs in the system decreases the purging efficiency of the system because the purging step must occur for a longer period of time—and additional purge gas must be used—in order to sufficiently purge all of the chemical from the wetted surfaces of the system.

Accordingly, there is a need for improved systems and methods that increase the purge efficiency of these systems.

SUMMARY

This Summary is provided to introduce a selection of aspects of the invention in a simplified form that are further described below in the Detailed Description.

Aspect 1: A valve block comprising: a housing having a first side, a second side, and a third side, wherein the first side opposes the second side and the third side is located adjacent to both of the first side and the second side; a first valve seat located on the first side; a first conduit having a first opening that terminates on the first side and within the first valve seat and a second opening that terminates on the second side, the first conduit being linear, the first opening being selectively openable and closeable; a second valve seat located on the third side; and a second conduit extending at an angle from the first conduit, the second conduit being in fluid flow communication with the first conduit, the second conduit having an opening that terminates on the third side within the second valve seat, the opening of the second conduit being selectively openable and closeable.

Aspect 2: The valve block of Aspect 1, wherein the second conduit is connected in fluid flow communication to the first conduit at a 90 degree angle.

Aspect 3: The valve block of either of Aspect 1 or Aspect 2, wherein the housing is in the shape of a rectangular prism.

Aspect 4: The valve block of any of Aspects 1-3, wherein at least one of the first valve seat and the second valve seat is in the shape of a cylindrical depression.

Aspect 5: A system comprising: a liquid refill source; a purge gas source; and a valve block having a first port opening connected in fluid flow communication to both the liquid refill source and the purge gas source, the first port opening located on a first side of the valve block, a second port opening, the second port opening located on a second side of the valve block, the second side being located opposite the first side, a first conduit portion connected in fluid flow communication between the first port opening and the second port opening, the second port opening being selectively openable and closeable, the first port opening and the second port opening being axially aligned, and a second conduit portion that extends from the first conduit portion at a non-parallel angle thereto, the second conduit portion being in fluid flow communication with the first conduit portion, the second conduit portion terminating at a third port opening located on a third side of the valve block, the third port opening being selectively openable and closeable.

Aspect 6: The system of Aspect 5, wherein the third side of the valve block is located adjacent to both of the first side and the second side of the valve block.

Aspect 7: The system of either of Aspect 5 or Aspect 6, wherein the second conduit portion extends from the first conduit portion at a 90 degree angle.

Aspect 8: The system of any of Aspects 5-7, further comprising a fourth port opening located on the second side of the valve block; a fifth port opening located on a fourth side of the valve block, the fourth side being located opposite the third side; and a third conduit portion connected in fluid flow communication between the fourth port opening and the fifth port opening.

Aspect 9: The system of Aspect 8, wherein the third conduit portion has a bend therein.

Aspect 10: The system of Aspect 9, wherein the bend is at a 90 degree angle.

Aspect 11: The system of any of Aspects 8-10, further comprising a container, wherein the fifth port opening is connected in fluid flow communication to the container.

Aspect 12: The system of any of Aspects 8-11, further comprising a sixth port opening located on the third side of the valve block; a seventh port opening located on a fifth side of the valve block, the fifth side being located adjacent to each of the first, second, and third sides; and a fourth conduit portion connected in fluid flow communication between the fifth port opening and the sixth port opening.

Aspect 13: The system of Aspect 12, wherein the fourth conduit portion has a bend therein.

Aspect 14: The system of Aspect 13, wherein the bend of the fourth conduit portion is at a 90 degree angle.

Aspect 15: The system of any of Aspects 12-14, further comprising a vent, wherein the seventh port opening is connected in fluid flow communication to the vent.

Aspect 16: The system of any of Aspects 5-15, wherein centerpoints of the first port opening and the second port opening lie in a first horizontal plane, the third port opening lies in a second horizontal plane, and the second horizontal plane is located above the first horizontal plane.

Aspect 17: The system of any of Aspects 8-15, wherein centerpoints of the first port opening and the second port opening lie in a first horizontal plane, a centerpoint of the fourth point opening lies in a second horizontal plane, and the first horizontal plane is located above the second horizontal plane.

Aspect 18: A method of performing a purge step in a valve block after the valve block has undergone a fill step, the method comprising: delivering a purge gas into the valve block through a first port opening located on a first side surface of the valve block such that the purge gas is directly projected through a first conduit portion into contact with a seal that has been temporarily created over a second port opening, the first conduit portion being linear, the second port opening being located on a second side surface of the valve block, the second side surface being located on an opposing side of the valve block from the first side surface, such that the purge gas rebounds off of the seal and travels in the opposite direction through the first conduit portion and enters a second conduit portion that extends at an angle from the first conduit portion, the second conduit portion terminating at a top surface of the valve block.

Aspect 19: The method of Aspect 18, wherein the delivering step further comprises delivering the purge gas into the valve block at a rate of at least 100 liters per minute.

Aspect 20: The method of Aspect 18, wherein the delivering step further comprises delivering the purge gas into the valve block at a rate of approximately 300 liters per minute.

Aspect 21: The method of either of Aspect 19 or Aspect 20, further comprising heating the purge gas to at least 50 degrees Celsius prior to the delivering step.

Aspect 22: The method of Aspect 18, further comprising heating the purge gas to at least 50 degrees Celsius prior to the delivering step.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
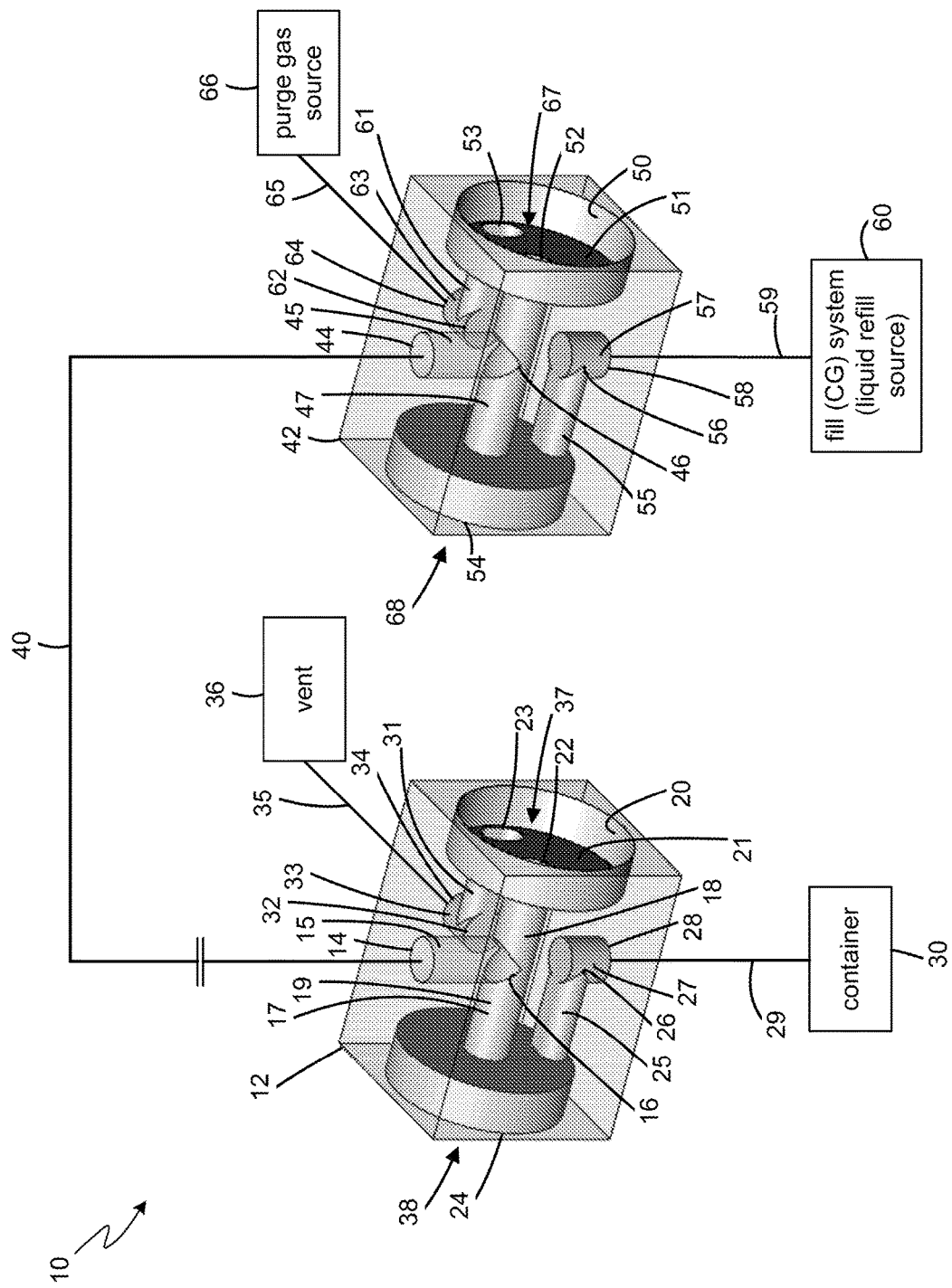
FIG. 1 is a schematic view of a refill manifold to host container manifold system comprising a pair of valve blocks according to the prior art.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

For purposes of the present specification and accompanying claims, the term "high velocity purge" means a purge step using a purge gas that is delivered at a rate of 100 liters per minute or greater.

For purposes of the present specification and accompanying claims, the term "conduit" refers to one or more structures through which fluids can be transported between two or more components of a system. For example, conduits can include pipes, ducts, manifolds, and combinations thereof that transport liquids and/or gases at varying pressures throughout a system.

For purposes of the present specification and accompanying claims, the term "fluid flow communication" refers to the nature of connectivity between two or more components that enables liquids and/or gases to be transported between the components in a controlled fashion. Coupling two or more components such that they are in fluid flow communication with each other can involve any suitable method known in the art, such as with the use of flanged conduits, gaskets, and/or bolts.

Applicant has developed an improved valve block design and system therefor that can be used to improve the purging efficiency for drying all wetted surfaces that are connected between either a chemical container and a manifold or between a pair of manifolds. The improved valve block design includes several features that can be used to significantly reduce the time required to purge all wetted surfaces within a system. The valve block design eliminates or introduces only minimal deadlegs, and provides for full impingement on any minimal deadlegs. It also allows for a substantial reduction in the length of the vent path, and therefore a substantial reduction in the total quantity of surface area of conduit that becomes wetted with liquid chemical.

The valve block according to the present invention accomplishes these improvements by having a pair of valves located within a single valve block or housing, the valve seats being oriented at a 90 degree difference relative to each other (e.g., on adjacent surfaces of a housing that is in the shape of a rectangular prism). When used in a system in which a refill manifold is connected to a host container through the valve block, the presence of the pair of valves set at 90 degrees apart ensures that all deadlegs are fully impinged upon during a purge step, thereby permitting a more efficient purge process. Specifically, the conduit through which purge gas enters the system is linearly aligned with the port opening that is in fluid flow communication with the container. Because this port opening is closed during the purge process, the minimal deadleg located adjacent to this port opening is fully impinged upon by the purge gas when said port opening is closed. Accordingly, less purge gas can be used, the purge process can occur more quickly, and energy savings can be realized. This is contrasted with known prior art systems (see FIGS. 1 and 2), in which the valve seats are located on opposing sides of the housing. This arrangement in the prior art devices does not allow for impingement on both halves of the common back-to-back liquid path while the purge gas (either from the purge gas source or the refill system) is being moved through the valve block, thereby requiring greater purge times and increased consumption of energy and purge gas. In addition, locating the valves at 90 degrees apart allows the liquid (vent) path to be kept very short, thereby greatly reducing the quantity of conduit surface area that becomes wetted and therefore must be dried. This is contrasted with a known prior art system (see FIG. 4), which has a comparably much longer liquid (vent) path that must be dried.

FIG. 1 is a schematic view of a prior art system 10 comprising a connection 40 between a host container manifold 12 and a refill manifold 42. In this system 10, the host container manifold 12 and refill manifold 42 are comprised of identical valve blocks according to the prior art in which the pair of valve seats 37,38 of the valve block 12 and the pair of valve seats 67,68 of the valve block 42 are located on opposing sides of their respective housing.

The valve block 12 (host container manifold) comprises an opening 14 that terminates on a side of the valve block 12 and that is connected in fluid flow communication via the connection 40 to the valve block 42 (refill manifold). The opening 14 is connected in fluid flow communication to a conduit portion 15, which is connected in fluid flow communication to a T-connection 16. The T-connection 16 is also connected in fluid flow communication with a conduit portion 17 that comprises a first portion 18 and a second portion 19.

On one side of the valve block 12 is a valve seat 37 comprising a cylindrical depression 20 that accommodates the placement of a valve control mechanism therein (not shown). The cylindrical depression 20 includes a surface 21 at which openings 22,23 terminate. Opening 22 is in fluid flow communication with the first portion 18 of the conduit portion 17. The valve control mechanism comprises a diaphragm that is engageable with opening 22, and therefore allows for selective opening and closing of opening 22. On an opposing side of the valve block 12 is a valve seat 38 comprising a cylindrical depression 24 that accommodates the placement of a second valve control mechanism therein (not shown). Like the cylindrical depression 20, the cylindrical depression 24 has a surface and two openings that terminate at the surface (the surface and openings are not shown in FIG. 1). The center one of the two openings is in fluid flow communication with the second portion 19 of the conduit portion 17, and the offset one of the two openings is in fluid flow communication with conduit portion 25. The second valve control mechanism is used to selectively open and close the center of the two openings on the surface of the cylindrical depression 24.

Conduit portion 25 is in fluid flow communication with conduit portion 27 via bend 26, and conduit portion 27 is in fluid flow communication with opening 28 on a side of the valve block 12 opposing the opening 14. Opening 28 is in fluid flow communication with container 30 via connection 29. Opening 23 located on surface 21 of cylindrical depression 20 is in fluid flow communication with conduit portion 31, which is in fluid flow communication with conduit portion 33 via bend 32. Conduit portion 33 is in fluid flow communication with opening 34 located on a side of the valve block 12, and opening 34 is in fluid flow communication with vent 36 via connection 35. In this embodiment, T-connection 16 and bends 26,32 orient respective connected conduit portions at 90 degree angles.

The valve block 42 (refill manifold) comprises an opening 44 that terminates on a side of the valve block 42 and that is connected in fluid flow communication via the connection 40 to the valve block 12 (host container manifold). The opening 44 is connected to a conduit portion 45, which is connected in fluid flow communication to a T-connection 46. The T-connection 46 is also connected in fluid flow communication with a conduit portion 47.

On one side of the valve block 42 is a valve seat 67 comprising a cylindrical depression 50 that accommodates the placement of a valve control mechanism therein (not shown). The cylindrical depression 50 includes a surface 51 at which openings 52,53 terminate. Opening 52 is in fluid flow communication with a first end of the conduit portion 47. The valve control mechanism comprises a diaphragm that is engageable with opening 52, and therefore allows for selective opening and closing of opening 52. On an opposing side of the valve block 42 is a valve seat 68 comprising a cylindrical depression 54 that accommodates the placement of a second valve control mechanism therein (not shown). Like the cylindrical depression 50, the cylindrical depression 54 has a surface and two openings that terminate at the surface (the surface and openings are not shown in FIG. 1). The center one of the two openings is in fluid flow communication with one end of the conduit portion 47, and the offset one of the two openings is in fluid flow communication with conduit portion 55. The second valve control mechanism is used to selectively open and close the center of the two openings on the surface of the cylindrical depression 54.

Conduit portion 55 is in fluid flow communication with conduit portion 57 via bend 56, and conduit portion 57 is in fluid flow communication with opening 58 on a side of the valve block 42 opposing the opening 44. Opening 58 is in fluid flow communication with a fill (CG) system 60 via connection 59. Opening 53 located on surface 51 of cylindrical depression 50 is in fluid flow communication with conduit portion 61, which is in fluid flow communication with conduit portion 63 via bend 62. Conduit portion 63 is in fluid flow communication with opening 64 located on a side of the valve block 42, and opening 64 is in fluid flow communication with a purge gas source 66 via connection 65. T-connection 46 and bends 56,62 orient respective connected conduit portions at 90 degree angles.

During a refill step of system 10, chemical is delivered from the fill (CG) system 60, passes through valve block 42, travels through connector 40, enters the valve block 12 via opening 14, moves through conduit portions 15,17,25,27, exits valve block 12 via opening 28, and is delivered to container 30 via connection 29. During this step, the opening 22 is closed and the center opening corresponding with valve seat 38 is open, and liquid chemical unavoidably wets the surfaces of both the first portion 18 and the second portion 19 of the conduit portion 17.

During a purge step of system 10, the center one of the two openings that corresponds with cylindrical depression 20 of valve block (host container manifold) 12 is closed, and the opening 22 is open so that purge gas can travel through openings 22,23, pass through conduit portions 31,33, exit the valve block 12 through opening 34, travel through connection 35, and reach the vent 36. The purge gas enters the valve block 12 via opening 14 and travels into the conduit portion 15, which is oriented at a right angle with respect to second portion 19. Owing to the 90-degree bend between conduit portion 15 and second portion 19, when the system 10 of FIG. 1 is undergoing a purge step the second portion 19 of the conduit portion 17 is a non-impinged deadleg because the purge gas travelling through conduit portion 15 is not directly projected into second portion 19 (which has been previously wetted), but is instead only weakly and partially distributed into the second portion 19. Accordingly, a high quantity of purge gas must be used and a long purge cycle must occur in order to completely dry the wetted surfaces of the system 10, including the wetted surfaces of the second portion 19.

Figure 2:
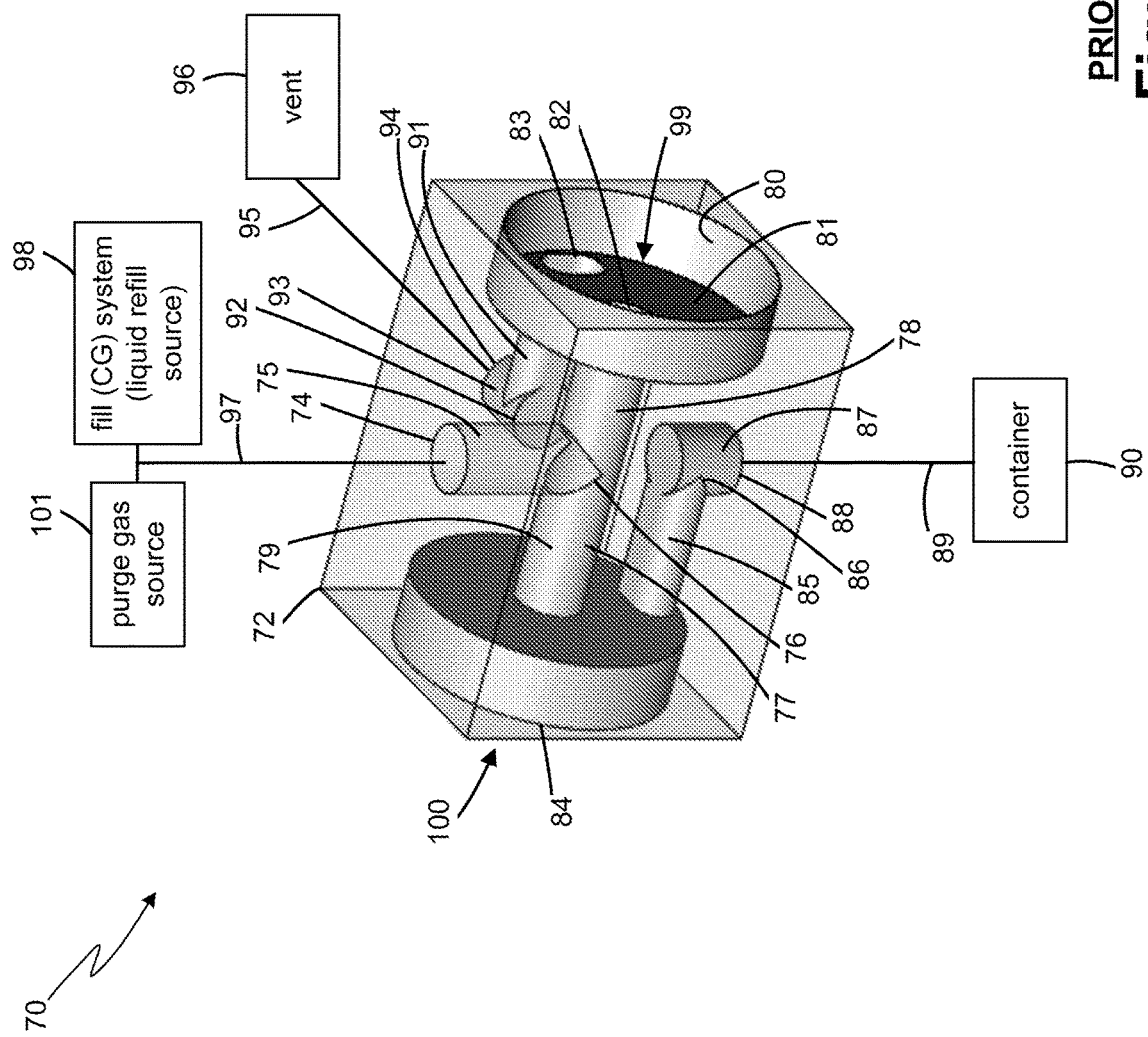
FIG. 2 is a schematic view of a refill system to host container manifold system comprising a valve block according to the prior art.

FIG. 2 is a schematic view of a prior art system 70 comprising a host container manifold 72. In this system 70, the host container manifold 72 is identical to the prior art valve blocks 12,42 shown in FIG. 1.

The valve block 72 (host container manifold) comprises an opening 74 that terminates on a side of the valve block 72 and that is connected in fluid flow communication via the connection 97 to both a refill (CG) system 98 and a purge gas source 101. The opening 74 is connected to a conduit portion 75, which is connected in fluid flow communication to a T-connection 76. The T-connection 76 is also connected in fluid flow communication with a conduit portion 77 that comprises a first portion 78 and a second portion 79.

On one side of the valve block 72 is a valve seat 99 comprising a cylindrical depression 80 that accommodates the placement of a valve control mechanism therein (not shown). The cylindrical depression 80 includes a surface 81 on which openings 82,83 terminate. Opening 82 is in fluid flow communication with the first portion 78 of the conduit portion 77. The valve control mechanism allows for selective opening and closing of the openings 82. On an opposing side of the valve block 72 is a valve seat 100 comprising a cylindrical depression 84 that accommodates the placement of a second valve control mechanism therein (not shown). Like the cylindrical depression 80, the cylindrical depression 84 has a surface and two openings that terminate at the surface (the surface and openings are not shown in FIG. 2). The center one of the two openings is in fluid flow communication with the second portion 79 of the conduit portion 77, and the offset one of the two openings is in fluid flow communication with conduit portion 85. The second valve control mechanism is used to selectively open and close the center one of the openings on the surface of the cylindrical depression 84.

Conduit portion 85 is in fluid flow communication with conduit portion 87 via bend 86, and conduit portion 87 is in fluid flow communication with opening 88 on a side of the valve block 72 opposing the opening 74. Opening 88 is in fluid flow communication with container 90 via connection 89. Opening 83 located on surface 81 of cylindrical depression 80 is in fluid flow communication with conduit portion 91, which is in fluid flow communication with conduit portion 93 via bend 92. Conduit portion 93 is in fluid flow communication with opening 94 located on a side of the valve block 72, and opening 94 is in fluid flow communication with vent 96 via connection 95. T-connection 76 and bends 86,92 orient respective connected conduit portions at 90 degree angles.

Like the prior art system shown in FIG. 1, due to the 90-degree bend between conduit portion 75 and second portion 79, when the system 70 of FIG. 2 is undergoing a purge step the second portion 79 of the conduit portion 77 is a non-impinged deadleg because the purge gas travelling through conduit portion 75 is not directly projected into second portion 79 (which has been previously wetted), but is instead only weakly and partially distributed into the second portion 79. Accordingly, a high quantity of purge gas must be used and a long purge cycle must occur in order to completely dry all of the wetted surfaces of the system 70, including the wetted surfaces of the second portion 79.

Figure 3:
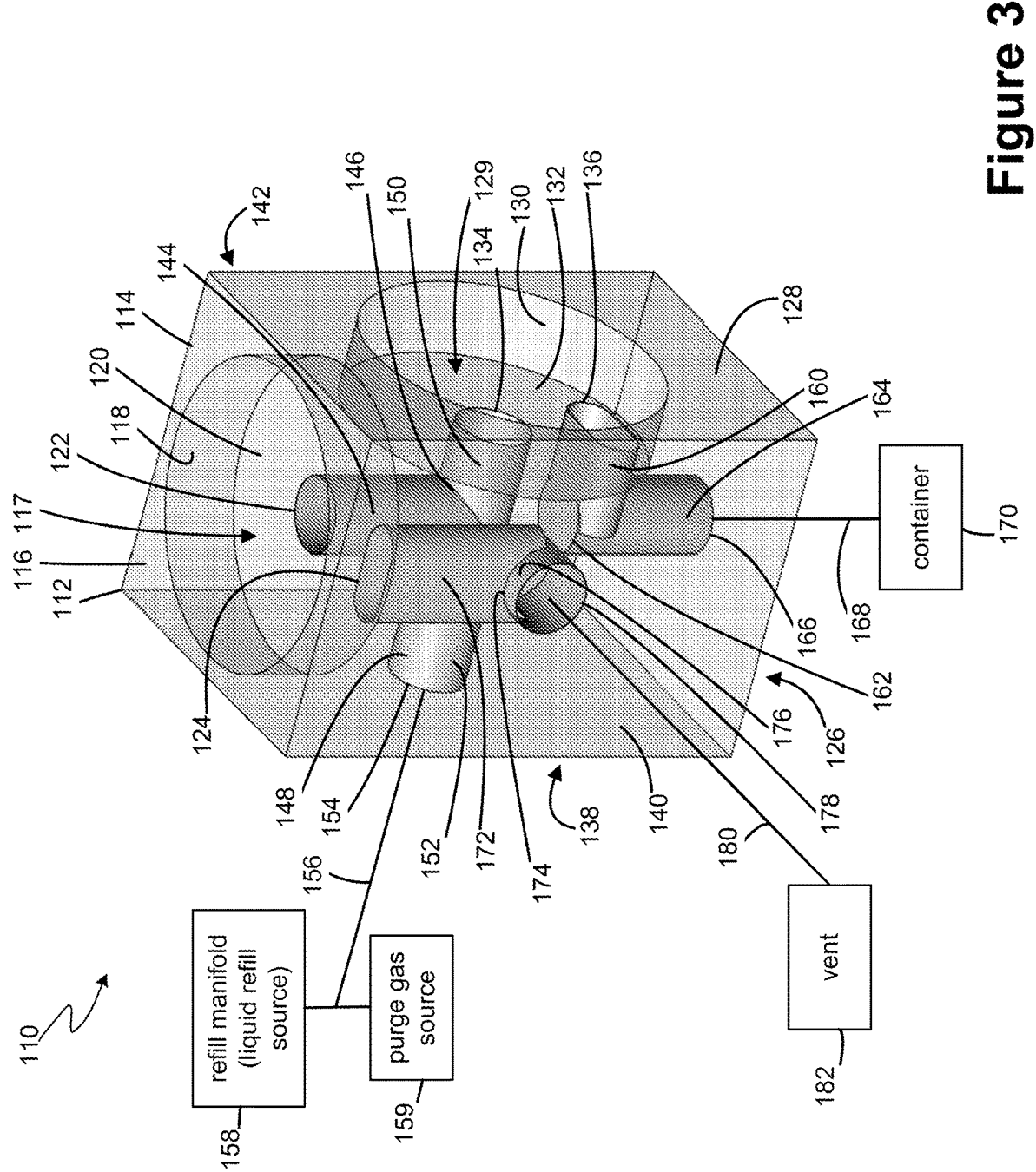
FIG. 3 is a schematic view of a refill manifold to host container manifold system comprising an improved valve block according to the present invention.

Referring now to FIG. 3, a refill manifold to host container manifold system 110 comprising an improved valve block 112 according to the present invention will now be described in detail.

The valve block 112 according to the present invention comprises a housing 114 that is approximately a rectangular prism in shape, although other housing shapes are possible within the scope of this invention, including generally cubic, spherical, or ovoid shapes or irregular shapes. In this embodiment, the housing 114 comprises a first side 116 that includes a valve seat 117 comprising a cylindrical depression 118. The cylindrical depression 118 comprises a surface 120 at which openings 122,124 terminate and a second side 126 that opposes the first side 116. The cylindrical depression 118 accommodates the placement of a valve control mechanism therein (not shown). The valve control mechanism allows for selective opening and closing of the opening 122 via a diaphragm that is fully engageable with the opening 122.

The opening 122 is connected in fluid flow communication to a conduit portion 144, which is connected in fluid flow communication to a T-connection 146. The T-connection 146 is also connected in fluid flow communication with a conduit portion 148 that comprises a first portion 150 and a second portion 152. The valve block 112 further comprises a third side 128 that includes a valve seat 129 comprising a cylindrical depression 130. The cylindrical depression 130 comprises a surface 132 at which openings 134,136 terminate, a fourth side 138 that opposes the third side 128, a fifth side 140, and a sixth side 142 that opposes the fifth side 140. The cylindrical depression 130 accommodates the placement of a second valve control mechanism therein (not shown). The second valve control mechanism is used to selectively open and close the opening 134 via a diaphragm that is fully engageable with the opening 134. Opening 134 is in fluid flow communication with the first portion 150 of the conduit portion 148, and opening 136 is in fluid flow communication with conduit portion 160. In this embodiment, the cylindrical depressions 118,130 of the valve seats 117,129 that accommodate attachment of the valve control mechanisms are located on adjacent sides of the housing 114 (i.e., first side 116 and third side 128), instead of on opposing sides of the housing of the valve block as shown in the prior art embodiments of FIGS. 1 and 2. In this embodiment, the openings 134,154 are axially aligned, i.e., the centerpoints of the openings 134,154 are aligned along the same linear axis (via a line that could be drawn through the center of the volume of conduit portion 148).

The second portion 152 of the conduit portion 148 is in fluid flow communication with an opening 154 located on the fourth side 138 of the valve block 112, and the opening 154 is in fluid flow communication with both a refill manifold 158 and a purge gas source 159 via connection 156. Conduit portion 160 is in fluid flow communication with conduit portion 164 via bend 162, and conduit portion 164 is in fluid flow communication with opening 166 located on the second side 126 of the housing 114. Opening 166 is in fluid flow communication with container 170 via connection 168. Opening 124 located on surface 120 of cylindrical depression 118 is in fluid flow communication with conduit portion 172, which is in fluid flow communication with conduit portion 176 via bend 174. Conduit portion 176 is in fluid flow communication with opening 178 located on fifth side 140 of the housing 114, and opening 178 is in fluid flow communication with vent 182 via connection 180. In this embodiment, T-connection 146 and bends 162,174 orient respective connected conduit portions at 90 degree angles. It should be understood that in alternate embodiments, the T-connection 146 and/or bends 162,174 need not orient respective connected conduit portions at 90 degree angles, but could instead orient respective connected conduit portions at any angle between 45-135 degrees.

In the system 110 of FIG. 3, when the container 170 is being refilled from the refill manifold 158 through the valve block 112, opening 134 is open and opening 122 is closed. In this step, liquid chemical enters the valve block 112 via opening 154, travels through conduit portion 148, exits out of opening 134, enters opening 136, travels through conduit portions 160,164, exits the valve block 112 via opening 166, and is delivered to container 170 through connection 168. It is an improvement over the prior art that in system 110 that opening 136 is physically located below opening 134 so that liquid flows naturally via the force of gravity from opening 134 into opening 136, and then downwardly into container 170. This is contrasted with the orientation of the pair of openings within each respective valve seat in the prior art devices shown in FIGS. 1 and 2, in which these openings are located in the same horizontal plane and do not promote natural movement of liquid out of the valve block.

Further, unlike the prior art systems 10,70 shown in FIGS. 1 and 2, when the system 110 of FIG. 3 according to the present invention is undergoing a purge step wherein purge gas from the purge gas source 159 is delivered through connection 156 into conduit portion 148, both portions 150,152 of the conduit portion 148 (which have been previously wetted) are fully impinged, i.e., there are no non-impinged deadlegs. During the purge step, opening 134 will be closed and opening 122 will be open so that purge gas can enter conduit portion 144, travel through openings 122,124, pass through conduit portions 172,176, exit the valve block 112 through opening 178, travel through connection 180, and reach the vent 182. The purge gas enters the valve block 112 via opening 154 and first enters the second portion 152 of the conduit portion 148. In this embodiment, because second portion 152 of conduit portion 148 is linearly (axially) aligned with first portion 150, when the system 110 of FIG. 3 is undergoing a purge step the first portion 150 of the conduit portion 148 is fully impinged by the purge gas that is entering the valve block 112 via opening 154. The purge gas is directly projected into contact with the diaphragm of the valve control mechanism that is sealing the opening 154, and the purge gas must then rebound in the opposite direction through the first portion 150 of conduit portion 148 before it can enter conduit portion 144. Because first portion 150 is fully impinged in the present system 110, a much lesser quantity of purge gas can be used and a much shorter purge cycle can occur in order to completely dry all wetted surfaces, including the wetted surfaces of the first portion 150.

Figure 4:
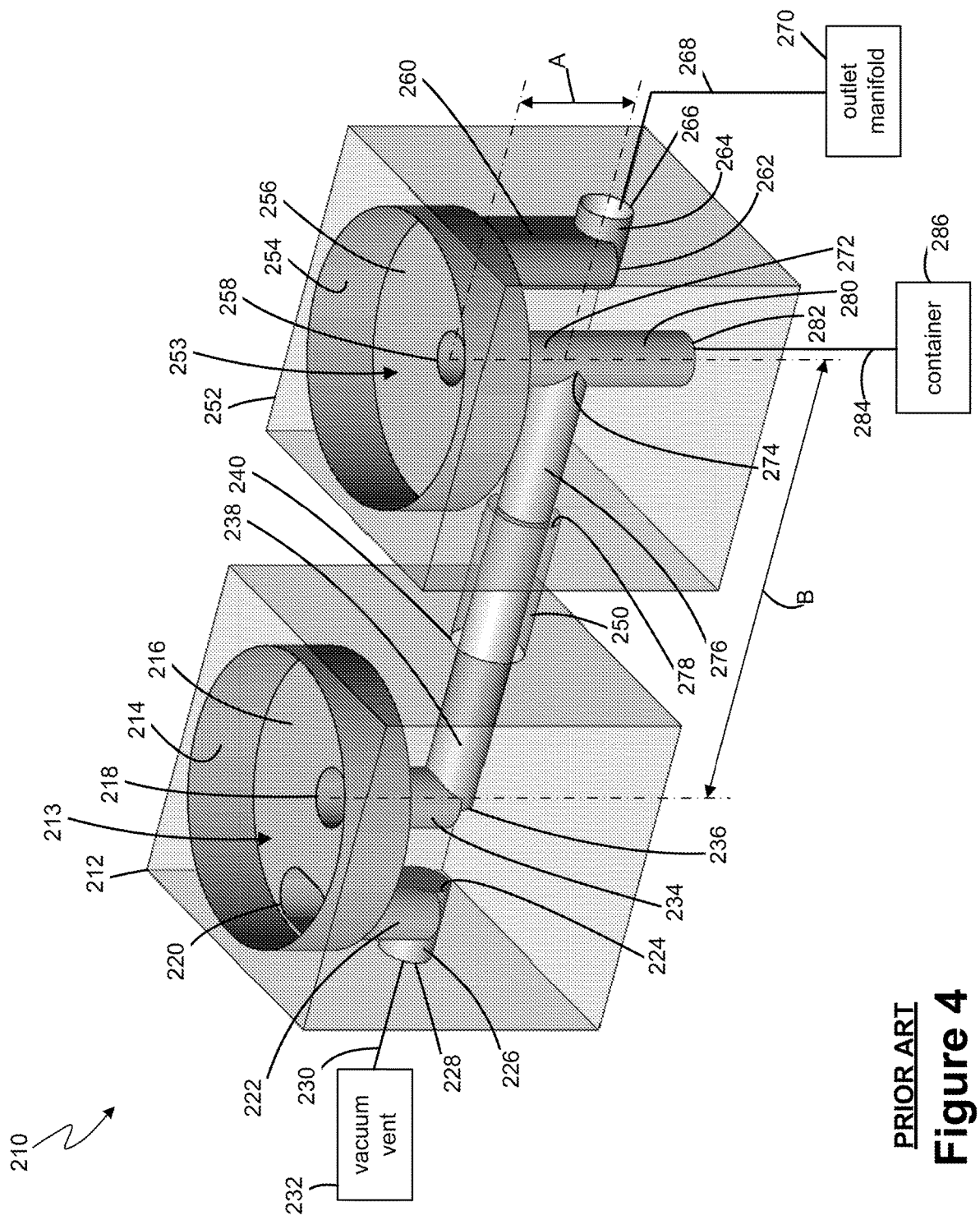
FIG. 4 is a schematic view of portions of a manifold located within a bulk chemical cabinet comprising valve blocks according to the prior art.

FIG. 4 is a schematic view of portions of a prior art manifold system 210. The system 210 comprises a connection 250 between two valve blocks 212,252 that are located within a manifold located in the bulk chemical cabinet that interfaces with the bulk chemical container. As would be appreciated by one having ordinary skill in the art, the bulk chemical cabinet is used to provide chemical to the host container manifold to refill the host container after the tool has used up the chemical that was available in the host container.

The valve block 212 comprises a valve seat 213 having a cylindrical depression 214 that accommodates the placement of a valve control mechanism therein (not shown). The cylindrical depression 214 includes a surface 216 at which openings 218,220 terminate. The valve control mechanism is used to selectively open and close the opening 218 via a diaphragm that is fully engageable with the opening 218. The opening 218 is connected in fluid flow communication to a conduit portion 234, which is connected in fluid flow communication to a conduit portion 238 via a bend 236. Conduit portion 238 extends through a throughhole 240 located in a side of the valve block 212 so that conduit portion 238 is connected in fluid flow communication with conduit portion 276 of valve block 252 via a connection 250. The opening 220 is connected in fluid flow communication to a conduit portion 222, which is connected in fluid flow communication to a conduit portion 226 via a bend 224. Conduit portion 226 is connected in fluid flow communication with opening 228, which is connected in fluid flow communication with vacuum vent 232 via connection 230.

Valve block 252 comprises a valve seat 253 having a cylindrical depression 254 that accommodates the placement of a second valve control mechanism therein (not shown). The cylindrical depression 254 includes a surface 256 at which two openings (including opening 258; other opening not shown in FIG. 4) terminate. The second valve control mechanism is used to selectively open and close the opening 258. The opening 258 is connected in fluid flow communication to a conduit portion 272, which is connected in fluid flow communication to a T-connection 274. The T-connection 274 is also connected in fluid flow communication with the conduit portion 276 and a conduit portion 280. Conduit portion 276 extends through a throughhole 278 located in a side of the valve block 252 and, as noted above, is connected in fluid flow communication with conduit portion 238 of valve block 212 via connection 250.

The conduit portion 280 is connected in fluid flow communication with opening 282, which is in fluid flow communication with container 286 via connection 284. The offset opening (not shown) on the surface 256 of the cylindrical depression 254 is connected in fluid flow communication to a conduit portion 260, which is connected in fluid flow communication to a conduit portion 264 via a bend 262. Conduit portion 264 is connected in fluid flow communication with opening 266, which is connected in fluid flow communication with outlet manifold 270 via connection 268. In this embodiment, T-connection 274 and bends 224,236,262 orient respective connected conduit portions at 90 degree angles.

As shown in FIG. 4, the sum of the lengths A and B of the portions of the vent path that are wetted with chemical during operation of the prior art system 210 is quite long. For purposes of clarity, length A corresponds with the length of the conduit portion 272 of the valve block 252 (measured between the center of the area of the opening 258 and the center of the cross-sectional area of the conduit portion 276) and length B corresponds with the combined lengths of the conduit portion 238 of the valve block 212 and the conduit portion 276 of the valve block 252 (measured between the center of the area of the opening 218 and the center of the area of the opening 258).

Figure 5:
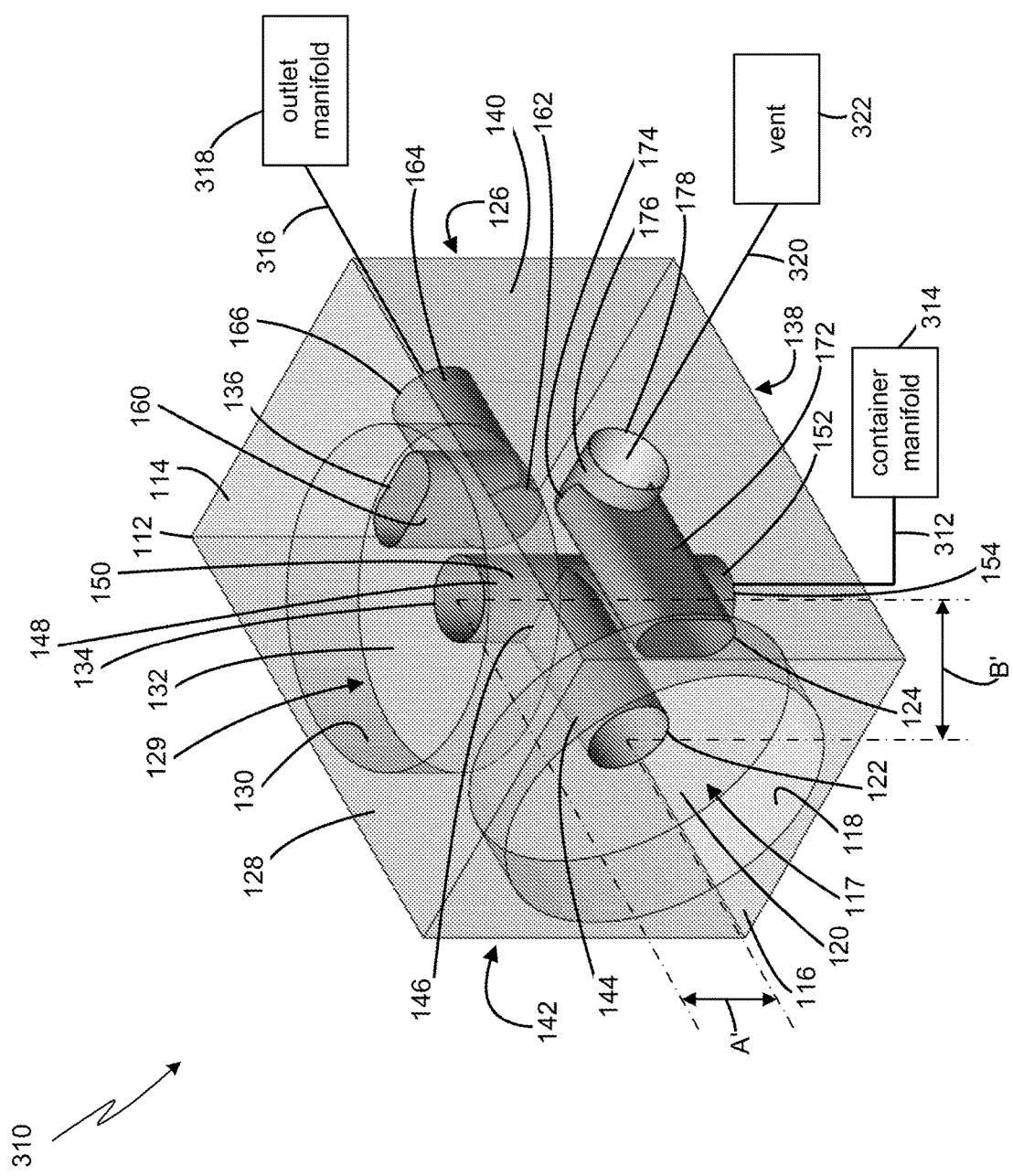
FIG. 5 is a schematic view of a portions of a manifold located within a bulk chemical cabinet comprising the improved valve block according to the present invention.

FIG. 5 is a schematic view of portions of a manifold system 310 located within a bulk chemical cabinet, the system 310 comprising the improved valve block 112 according to the present invention (see FIG. 3). When put to use in this system 310, the opening 154 that terminates on the fourth side 138 of the valve block 112 is connected in fluid flow communication with a container manifold 314 via a connection 312, the opening 166 that terminates on the second side 126 of the valve block 112 is connected in fluid flow communication with an outlet manifold 318 via a connection 316, and the opening 178 that terminates on the fifth side 140 of the valve block 112 is connected in fluid flow communication with a vent 322 via a connection 320.

As shown in FIG. 5, the sum of the lengths A' and B' of the portions of the vent path that are wetted with chemical during operation of the manifold system 310 according to the present invention is much shorter than the sum of the lengths A and B of the portions of the vent path of the prior art system 210 shown in FIG. 4. For purposes of clarity, length A' corresponds with the length of the conduit portion 148 of the valve block 112 (measured between the center of the area of the opening 134 and the center of the cross-sectional area of the conduit portion 144) and length B' corresponds with the length of the conduit portion 144 of the valve block 112 (measured between the center of the area of the opening 122 and the center of the area of the opening 134). The geometry of the valve block 112 according to the present invention permits for a substantial reduction in the overall vent path length (i.e., the sum of the lengths A' and B'). In this embodiment, the value of the sum of the lengths A' and B' is approximately 10 percent that of the value of the sum of the lengths A and B. The reduction in the length of the vent path made possible by the improved valve block 112 of the present invention—coupled with the fact that all deadlegs are fully impinged upon as discussed above in detail—greatly reduces the total surface area of wetted surfaces that must be dried during the purge step and thereby greatly increases the efficiency of the purge process.

A first additional aspect of the present invention is a method of using high velocity purge gas to minimize the purging time of all wetted surfaces in the systems described herein above or other systems not disclosed in this application. By using a high velocity purge—wherein purge gas is delivered to a system at a rate of at least 100 liters per minute—Applicant has determined that the length of time necessary to perform the purge process can be greatly reduced. The high velocity purge step preferably occurs at flow rates between 100-1,000 liters per minute, more preferably between 200-750 liters per minute, even more preferably between 250-500 liters per minute, and most preferably at 300 liters per minute.

Example #1

In a prior art system incorporating a valve block 12 according to the prior art, a purge step has been performed using purge gas introduced at a standard rate of approximately 10 liters per minute. Applicants have determined that a duration of approximately 3-7 days is typically required in order to completely dry all wetted surfaces of the system according to these parameters. On the contrary, when a system 70 according to the present invention (i.e., incorporating valve block 72) undergoes a purge step in which purge gas is introduced at approximately 300 liters per minute, the duration required to dry all wetted surfaces within the system 70 is shortened to between 2-4 hours.

A second additional aspect of the present invention is a method by which nitrogen gas (N2) is heated and then used as the purge gas in the systems described herein above or other systems not disclosed in this application. In some embodiments, the nitrogen gas is heated to at least 50 degrees Celsius prior to the purge step. Nitrogen gas that has been heated to at least 50 degrees Celsius could be used alone at a low velocity, or in combination with a high velocity purge as described above. Applicants have discovered that it is desirable to heat the purge gas to a temperature similar to the temperature of the media that is being purged in order to raise the vapor pressure of said media to such a point that it is easier to remove from the system.

Example #2

In a prior art system incorporating a valve block 12 according to the prior art, a purge step has been performed using purge gas at ambient temperature (approximately 20 degrees Celsius) introduced at a standard rate of approximately 10 liters per minute. Applicants have determined that a duration of approximately 3-7 days is typically required in order to completely dry all wetted surfaces of the system according to these parameters. On the contrary, when a system 70 according to the present invention (i.e., incorporating valve block 72) undergoes a purge step in which purge gas has been heated to 50 degrees Celsius and is introduced at approximately 200 liters per minute, the duration required to dry all wetted surfaces within the system 70 is shortened to between 2-4 hours.

While the principles of the invention have been described above in connection with preferred embodiments, it is to be clearly understood that this description is made only by way of example and not as a limitation of the scope of the invention.

What is claimed is:

1. A valve block comprising: a housing having a first side, a second side, and a third side, wherein the first side opposes the second side and the third side is located adjacent to both of the first side and the second side; a first valve seat comprising a cylindrical depression located on the second side; a first conduit having a second opening that terminates on the second side and within the first valve seat and a first opening that terminates on the first side, the first conduit being linearly aligned from the first opening to the second opening, the first opening being selectively openable and closeable; a second valve seat located on the third side; and a second conduit extending at an angle from the first conduit, the second conduit being in fluid flow communication with the first conduit, the second conduit terminating as an opening on the third side within the second valve seat, the opening of the second conduit being selectively openable and closeable, said valve block further comprising a fifth opening located on a fourth side of the valve block, the fourth side being located opposite the third side, a fourth opening terminating in said first valve seat and a third conduit portion connected in fluid flow communication between the fourth opening and the fifth opening.

2. The valve block of claim 1, wherein the second conduit is connected in fluid flow communication to the first conduit at a 90 degree angle.

3. The valve block of claim 1, wherein the housing is in the shape of a rectangular prism.

4. The valve block of claim 1, wherein the second valve seat is in the shape of a cylindrical depression and an additional opening to a fourth conduit terminates in the second valve seat.

5. A system comprising: a liquid refill source; a purge gas source; and a valve block having a first port opening connected in fluid flow communication to both the liquid refill source and the purge gas source, the first port opening located on a first side of the valve block, a second port opening, the second port opening located on a second side of the valve block in a first valve seat, the second side being located opposite the first side, a first conduit portion connected in fluid flow communication between the first port opening and the second port opening, the second port opening being selectively openable and closeable, the first port opening and the second port opening being axially aligned, and a second conduit portion that extends from the first conduit portion at a non-parallel angle thereto, the second conduit portion being in fluid flow communication with the first conduit portion, the second conduit portion terminating at a third port opening located in a second valve seat on a third side of the valve block, the third port opening being selectively openable and closeable and a fourth port opening located in the first valve seat on the second side of the valve block; a fifth port opening located on a fourth side of the valve block, the fourth side being located opposite the third side; and a third conduit portion connected in fluid flow communication between the fourth port opening and the fifth port opening.

6. The system of claim 5, wherein the third side of the valve block is located adjacent to both of the first side and the second side of the valve block.

7. The system of claim 5, wherein the second conduit portion extends from the first conduit portion at a 90 degree angle.

8. The system of claim 5, wherein the third conduit portion has a bend therein.

9. The system of claim 5, further comprising a container, wherein the fifth port opening is connected in fluid flow communication to the container.

10. The system of claim 5, further comprising a sixth port opening located in the second valve seat on the third side of the valve block; a seventh port opening located on a fifth side of the valve block, the fifth side being located adjacent to each of the first, second, and third sides; and a fourth conduit portion connected in fluid flow communication between the seventh port opening and the sixth port opening.

11. The system of claim 10, wherein the fourth conduit portion has a bend therein.

12. The system of claim 10, further comprising a vent, wherein the seventh port opening is connected in fluid flow communication to the vent.

13. The system of claim 5, wherein centerpoints of the first port opening and the second port opening lie in a first horizontal plane, the third port opening lies in a second horizontal plane, and the second horizontal plane is located above the first horizontal plane.

14. The system of claim 5, wherein centerpoints of the first port opening and the second port opening lie in a first horizontal plane, a centerpoint of the fourth port opening lies in a second horizontal plane, and the first horizontal plane is located above the second horizontal plane.

15. A method of performing a purge step in a valve block after the valve block has undergone a fill step, the method comprising: delivering a purge gas into the valve block through a first port opening located on a first side surface of the valve block such that the purge gas is directly projected through a first conduit portion into contact with a seal that has been temporarily created over a second port opening, the first conduit portion being linear, the second port opening being located on a second side surface of the valve block, the second side surface being located on an opposing side of the valve block from the first side surface, such that the purge gas rebounds off of the seal and travels in the opposite direction through the first conduit portion and enters a second conduit portion that extends at an angle from the first conduit portion, the second conduit portion terminating at a top surface of the valve block.

16. The method of claim 15, wherein the delivering step further comprises delivering the purge gas into the valve block at a rate of at least 100 liters per minute.

17. The method of claim 16, further comprising heating the purge gas to at least 50 degrees Celsius prior to the delivering step.

18. The method of claim 15, wherein the delivering step further comprises delivering the purge gas into the valve block at a rate of between 250 and 500 liters per minute.

19. The method of claim 15, further comprising heating the purge gas to at least 50 degrees Celsius prior to the delivering step.

20. The method of claim 15, further comprising the step of: after exiting said second conduit, said purge gas enters a fourth conduit portion located at said top surface of the valve block, said fourth conduit terminating in a vent.

* * * * *